(12) United States Patent
Xie et al.

(10) Patent No.: US 10,861,499 B2
(45) Date of Patent: Dec. 8, 2020

(54) METHOD OF EDITING MEDIA, MEDIA EDITOR, AND MEDIA COMPUTER

(71) Applicant: SZ DJI TECHNOLOGY CO., LTD., Shenzhen (CN)

(72) Inventors: Bin Xie, Shenzhen (CN); Guang Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 14 days.

(21) Appl. No.: 15/789,475

(22) Filed: Oct. 20, 2017

(65) Prior Publication Data

US 2018/0040349 A1 Feb. 8, 2018

Related U.S. Application Data

(63) Continuation of application No. PCT/CN2015/077072, filed on Apr. 21, 2015.

(51) Int. Cl.
| | | |
|---|---|---|
| G11B 27/036 | (2006.01) | |
| G06F 16/74 | (2019.01) | |
| G11B 27/031 | (2006.01) | |
| G11B 27/34 | (2006.01) | |

(52) U.S. Cl.
CPC .......... *G11B 27/036* (2013.01); *G06F 16/743* (2019.01); *G11B 27/031* (2013.01); *G11B 27/34* (2013.01)

(58) Field of Classification Search
CPC .................. G06F 17/30849; G11B 27/036
See application file for complete search history.

(56) References Cited

U.S. PATENT DOCUMENTS

| | | | | |
|---|---|---|---|---|
| 2005/0114784 A1* | 5/2005 | Spring | ............... | G06F 21/6245 715/762 |
| 2007/0260968 A1* | 11/2007 | Howard | ............... | G11B 27/034 |
| 2012/0096356 A1* | 4/2012 | Ubillos | ............... | G11B 27/034 715/723 |
| 2016/0055381 A1* | 2/2016 | Adsumilli | .......... | G06K 9/00751 386/241 |
| 2016/0225405 A1* | 8/2016 | Matias | .................... | G06F 16/78 |

FOREIGN PATENT DOCUMENTS

| | | |
|---|---|---|
| CN | 1938709 A | 3/2007 |
| CN | 101425076 A | 5/2009 |
| CN | 101695123 A | 4/2010 |
| CN | 104267951 A | 1/2015 |
| WO | 2004097599 A2 | 11/2004 |

OTHER PUBLICATIONS

The World Intellectual Property Organization (WIPO) International Search Report for PCT/CN2015/077072 dated Jan. 26, 2016 7 Pages.

* cited by examiner

*Primary Examiner* — Girumsew Wendmagegn
(74) *Attorney, Agent, or Firm* — Anova Law Group, PLLC

(57) ABSTRACT

A method of editing media includes loading a media template from a template library, receiving a media segment selecting instruction, selecting one or more media segments from a media library based upon the media segment selecting instruction, inserting the one or more media segments into the media template, and generating a video based on the media template containing the one or more media segments.

18 Claims, 4 Drawing Sheets

METHOD OF EDITING MEDIA, MEDIA EDITOR, AND MEDIA COMPUTER

CROSS-REFERENCE TO RELATED APPLICATION

This application is a continuation application of International Application No. PCT/CN2015/077072, filed on Apr. 21, 2015, the entire contents of which are incorporated herein by reference.

TECHNICAL FIELD

The present disclosure relates to video editing technology, and more particularly to a method of editing media, a media editor and a media computer.

BACKGROUND

Users can record videos with digital cameras or digital video cameras, and may want to select and merge favorite segments into a video work.

In currently used methods of editing video, a user can capture video segments and upload the captured video segments to a video editing tool (for example, Corel VideoStudio or Adobe Premiere). The user can locate or edit the video segments after watching the video segments, and then add a background music to generate the final video work.

However, video segments presented in the final video work are inserted and trimmed with the video editing tool. The video segment editing operations may be complex for a user who is not an expert of using video editing tools, therefore the user has to spend effort learning the video segment editing operations. The video segments may be synchronized with the background music with multiple attempts. The video segment editing operations may have to be performed again if the final video work is not qualified, causing a waste of time and effort.

SUMMARY OF THE DISCLOSURE

The present disclosure relates to video editing technology, and more particularly to a method of editing media, a media editor and a media computer. With the method of editing media and media editor of present disclosure, a user can create video works using media templates more efficiently.

A first aspect of the disclosure provides a method of editing media. The method of editing media can comprise: loading a default media template or a specified media template from a template library; receiving a media segment selecting instruction, selecting one or more media segments from a media library based upon the media segment selecting instruction, and inserting the one or more media segments into the media template; when a template changing instruction is received, loading a media template specified by the template changing instruction from the template library and changing the media template changing; and generating a video work from the media template into which the one or more media segments are inserted.

In some embodiments, the method can further comprise: when the template changing instruction is received in selecting the one or more media segments from the media library based upon the media segment selecting instruction, loading a media template specified by the template changing instruction from the template library and changing the media template.

In some embodiments, the process of loading the media template specified by the template changing instruction from the template library can comprise: obtaining a media parameter of the media template, the media parameter comprising the number of media insertion slots, and the number of media insertion slots being greater than or equal to 1.

In some embodiments, the method can comprise: after changing the media template, when the number of media segments is less than the number of media insertion slots of the media template, receiving another media segment selecting instruction, selecting one or more media segments from the media library based upon the another media segment selecting instruction, and inserting the one or more media segments into the media template.

In some embodiments, the processing of inserting the one or more media segments into the media template can comprise: when a length of the media segment is longer than the length of the media insertion slot, trimming the media segment to generate a segment matching the length of the media insertion slot.

In some embodiments, the process of trimming the media segment to generate a segment matching the length of the media insertion slot can comprise: extracting a segment matching the length of the media insertion slot by automatically expending from the midpoint of the timeline to both sides of the media segment, or, receiving a segment trimming instruction, and extracting a media segment of a specified time period from the media segment based upon the segment trimming instruction.

In some embodiments, the process of inserting the one or more media segments into the media template can comprise: when a length of the media segment is less than a length of the media insertion slot, extending the length of the media segment to the length of the media insertion slot, or inserting the media segment into the media insertion slot repeatedly.

In some embodiments, the method can further comprise: receiving a segment editing instruction, and editing the one or more media segments.

In some embodiments, after inserting the one or more media segments into the media template, the method can further comprise: one or more of: adjusting an order of the media segments, removing a specified media segment, or inserting a new media segment.

In some embodiments, the process of obtaining the media parameter of the media template can further comprise: obtaining one or more media parameters including a filter, a color, a tone, a sound effect, a prologue, an epilogue, a background music and a voice-over.

In some embodiments, the method can further comprise: when receiving a template editing instruction, editing the media parameter based upon the template editing instruction.

In some embodiments, the method can further comprise: when another template changing instruction is received after generating the video work from the media template into which the one or more media segments are inserted, loading a media template specified by the another template changing instruction from the template library and changing the media template.

In some embodiments, the process of electing one or more media segments from the media library based upon the media segment selecting instruction can comprise: selecting a video segment, a photo or a text from the media library based upon the media segment selecting instruction.

A second aspect of the disclosure provides a media computer comprising a display and a processor.

The processor can be configured to: load a default media template or a specified media template from a template library; receive a media segment selecting instruction, select one or more media segments from a media library based upon the media segment selecting instruction, and insert the one or more media segments into the media template; when a template changing instruction is received, load a media template specified by the template changing instruction from the template library and change the media template changing; and generate a video work from the media template into which the one or more media segments are inserted.

In some embodiments, the processor can be further configured to: when the template changing instruction is received during selecting the one or more media segments from the media library based upon the media segment selecting instruction, load a media template specified by the template changing instruction from the template library and change the media template.

In some embodiments, the processor can be further configured to: obtain a media parameter of the media template, the media parameter comprising the number of media insertion slots, and the number of media insertion slots being greater than or equal to 1.

In some embodiments, the processor can be further configured to: after the media template being changed, when the number of media segments is less than the number of media insertion slots of the media template, receive another media segment selecting instruction, select one or more media segments from the media library based upon the another media segment selecting instruction, and insert the one or more media segments into the media template.

In some embodiments, the processor can be further configured to: when a length of the media segment is longer than the length of the media insertion slot, trim the length of the media segment to generate a media segment matching the length of the media insertion slot.

In some embodiments, the processor can be further configured to: extract a segment matching the length of the media insertion slot by automatically expending from the midpoint of the timeline to both sides of the media segment; or receive a segment trimming instruction, and extract a segment of a specified time period from the media segment based upon the segment trimming instruction.

In some embodiments, the processor can be further configured to: when a length of the media segment is less than a length of the media insertion slot, extend the length of the media segment to the length of the media insertion slot, or insert the media segment into the media insertion slot repeatedly.

In some embodiments, the processor can be further configured to: receive a segment editing instruction, and edit the one or more media segments.

In some embodiments, the processor can be further configured to: after inserting the one or more media segments into the media template, perform one or more of adjusting an order of the media segments, removing a specified media segment, or inserting a new media segment.

In some embodiments, the processor can be further configured to: obtain one or more media parameters including a filter, a color, a tone, a sound effect, a prologue, an epilogue, a background music and a voice-over.

In some embodiments, the processor can be further configured to: when receiving a template editing instruction, edit the media parameter based upon the template editing instruction.

In some embodiments, the processor can be further configured to: when another template changing instruction is received after the video work is generated, load a media template specified by the another template changing instruction from the template library and change the media template.

In some embodiments, the processor can be further configured to: select a video segment, a photo or a text from the media library based upon the media segment selecting instruction.

A third aspect of the disclosure provides a media editor. The media editor can comprise: an loading module configured to load a default media template or a specified media template from a template library; an executing module configured to receive a media segment selecting instruction, select one or more media segments from a media library based upon the media segment selecting instruction, and insert the one or more media segments into the media template; a switching module configured to, when a template changing instruction is received, load a media template specified by the template changing instruction from the template library and change the media template changing; and a generating module configured to generate a video work from the media template into which the one or more media segments are inserted.

In some embodiments, the switching module can be further configured to: when the template changing instruction is received during selecting the one or more media segments from the media library based upon the media segment selecting instruction, load a media template specified by the template changing instruction from the template library and change the media template.

In some embodiments, the executing module can be further configured to: obtain a media parameter of the media template, the media parameter comprising the number of media insertion slots, and the number of media insertion slots being greater than or equal to 1.

In some embodiments, the executing module can be further configured to: after the media template being changed, when the number of media segments is less than the number of media insertion slots of the media template, receive another media segment selecting instruction, select one or more media segments from the media library based upon the another media segment selecting instruction, and insert the one or more media segments into the media template.

In some embodiments, the executing module can be further configured to: when a length of the media segment is longer than the length of the media insertion slot, trim the length of the media segment to generate a media segment matching the length of the media insertion slot.

In some embodiments, the executing module can be further configured to: extract a segment matching the length of the media insertion slot by automatically expending from the midpoint of the timeline to both sides of the media segment; or receive a segment trimming instruction, and extract a segment of a specified time period from the media segment based upon the segment trimming instruction.

In some embodiments, the executing module can be further configured to: when a length of the media segment is less than a length of the media insertion slot, extend the length of the media segment to the length of the media insertion slot, or insert the media segment into the media insertion slot repeatedly.

In some embodiments, the media editor can further comprise: an editing module configured to receive a segment editing instruction and edit the one or more media segments.

In some embodiments, the media editor can further comprise an editing module configured to: after inserting the one or more media segments into the media template, perform one or more of adjusting an order of the media segments, removing a specified media segment, or inserting a new media segment.

In some embodiments, the executing module can be further configured to: obtain one or more media parameters including a filter, a color, a tone, a sound effect, a prologue, an epilogue, a background music and a voice-over.

In some embodiments, the media editor can further comprise an editing module configured to: when receiving a template editing instruction, edit the media parameter based upon the template editing instruction.

In some embodiments, the switching module can be further configured to: when another template changing instruction is received after the video work is generated, load a media template specified by the another template changing instruction from the template library and change the media template.

In some embodiments, the executing module can be further configured to: select a video segment, a photo or a text from the media library based upon the media segment selecting instruction.

Various advantages can be appreciated from the embodiments as disclosed in the disclosure. The media editor can obtain a default media template or a specified media template from a template library, and obtain a media segment selecting instruction, select a media segment from a media library based upon the media segment selecting instruction, and insert the media segment into the media template. When receiving a template changing instruction, the media editor can load a media template specified by the template changing instruction from the template library, perform template changing and generate a video work from the media template into which the media segment is inserted. The user only needs to select a media segment and insert the media segment into the media template, thereby operation steps for video composition can be simplified, and the operation time of the user can be reduced. When a current media template is unqualified, the user can simply change the template by selecting another media template, which enables that the user can have various video styles.

BRIEF DESCRIPTION OF THE DRAWINGS

Drawings of embodiments of the disclosure will be described for better understanding of the embodiments of the disclosure. It will be apparent that, the drawings merely illustrate exemplary embodiments of the disclosure. Those skilled in the art can conceive other drawings in light of the illustrative drawings without inventive efforts.

DETAILED DESCRIPTION OF THE EMBODIMENTS

The present disclosure relates to video edit technology, and more particularly to a method of editing media, a media editor and a media computer. With the method of editing media and media editor of present disclosure, the user can create video works using media templates with improved efficiency.

A better understanding of the disclosure will be obtained by reference to the following detailed description that sets forth illustrative embodiments with reference to the drawings. It will be apparent that, the embodiments described herein are merely provided by way of example. Those skilled in the art can conceive other embodiments in light of embodiments disclosed herein without inventive efforts, and all these embodiments are within the scope of the disclosure.

As used in embodiments of the disclosure, the apparatus implementing a media editing function can be referred to as a media editor. The media editor can be a server, a terminal device or a logic unit of a device. The disclosure will be described by reference to illustrative embodiments.

Figure 1:
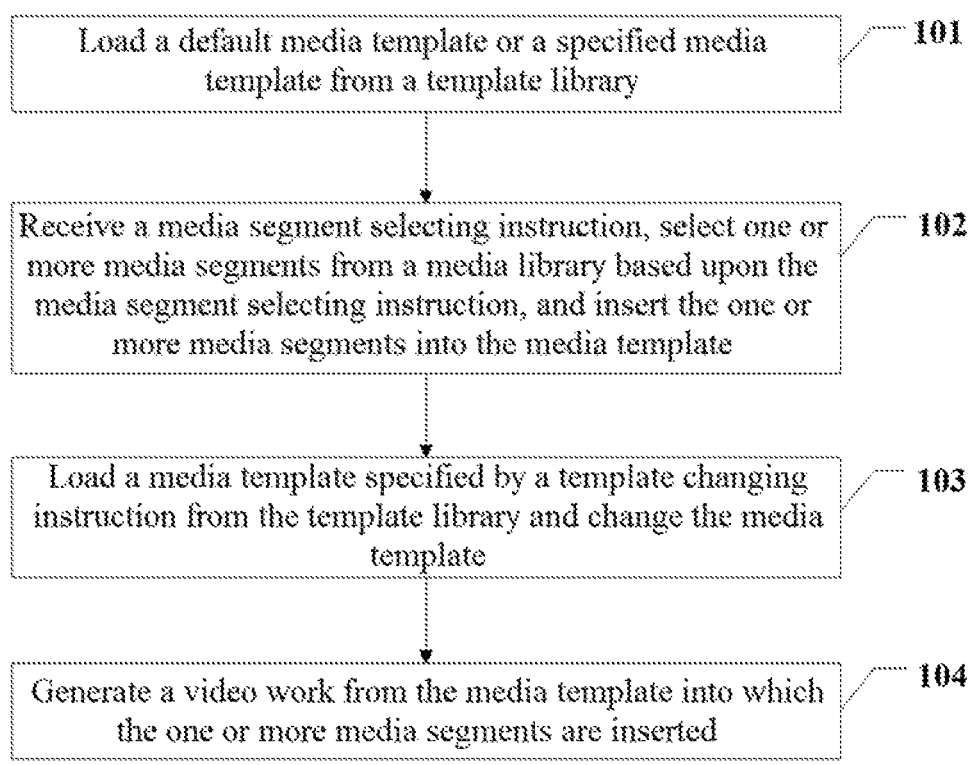
FIG. 1 shows a method of editing media in accordance with embodiments of the disclosure.

FIG. 1 shows a method of editing media in accordance with embodiments of the disclosure. The method can comprise steps 101-104.

In step 101, a default media template or a specified media template can be loaded from a template library.

In some embodiments, a default media template can be loaded from a template library when opening a media editor. Alternatively, a media template selecting instruction can be received, and a media template specified by the media template selecting instruction can be loaded from the template library. The media template can comprise a media parameter. In some instances, the media parameter can include the number of media insertion slots. The media parameter can further comprise one or more of a filter, a color, a tone, a sound effect, a prologue, an epilogue, a background music or a voice-over. In some embodiments, the number of the media insertion slots can be greater than or equal to 1.

In step 102, a media segment selecting instruction can be received, one or more media segments can be selected from a media library based upon the media segment selecting instruction, and the selected one or more media segments can be inserted into the media template.

In some embodiments, the media editor can be configured to receive the media segment selecting instruction, select one or more media segments from the media library based upon the media segment selecting instruction, and insert the selected one or more media segments into current media template. In some instances, the media segment can comprise a video segment, a photo or a text.

In step 103, a media template identified by a template changing instruction can be loaded from the template library, and a template changing can be performed.

In some embodiments, in selecting a media segment from the media library, a media template identified by the template changing instruction can be loaded from the template library when the media editor receives the template changing instruction, and the current media template can be switched to the media template identified by the template changing instruction.

It will be appreciated that, the process of switching the current media template can be performed when the template changing instruction is received in previewing or playing a generated video work.

In step 104, a video work can be generated from the media template into which the one or more media segments are inserted.

In some embodiments, the video work can be automatically generated by the media editor from the media template into which the one or more media segments are inserted. Optionally, a video work generating instruction can be received by the media editor, and the video work can then be generated from the media template into which the one or more media segments are inserted.

In the embodiment of this disclosure, the media editor can load the default media template or the specified media template from the template library, and receive the media segment selecting instruction to select one or more media segments from the media library based upon the media segment selecting instruction and insert the selected one or more media segments into the media template. The media editor can receive the template changing instruction and load a media template identified by the template changing instruction from the template library to change a template. The media editor can generate a video work from the media template into which the one or more media segments are inserted. The user's operation in composing a video work can be simplified and accelerated by simply selecting a media segment and inserting the media segment into the media template. When the user is not satisfied with the current media template, other media templates can be selected to implement a template changing, which enables user to get various video styles.

With the present disclosure, the media template can be changed in selecting the media segments, creating a flexible technical solution of the disclosure.

In some embodiments, after the media template being changed, the method can comprise, when the number of media segments is less than the number of media insertion slots of the media template, receiving another media segment selecting instruction, selecting one or more media segments from the media library based upon the another media segment selecting instruction, and inserting the one or more media segments into the media template.

With the present disclosure, the number of media segments can match the number of media insertion slots, thus the technical solution of the disclosure is improved.

In some embodiments, the process of inserting the media segment into the media template can comprise, when a length of the media segment is longer than the length of the media insertion slot, trimming the media segment to generate a segment matching the length of the media insertion slot.

With the present disclosure, the length of the media segment can match the length of the media insertion slot, thus the technical solution of the disclosure is improved.

In some embodiments, the process of trimming the media segment to generate a segment matching the length of the media insertion slot can comprise extracting a segment matching the length of the media insertion slot by automatically expending from the midpoint of the timeline to both sides of the media segment, or, receiving a segment trimming instruction and extracting a media segment of a specified time period from the media segment based upon the segment trimming instruction.

In some embodiments, inserting the media segment into the media template can comprise, when the length of the media segment is shorter than the length of the media insertion slot, extending the length of the media segment to the length of the media insertion slot, or, inserting the media segment into the media insertion slot repeatedly.

For instance, in case a video segment with a length of 5 seconds is to be inserted into a media insertion slot with a length of 8 seconds, the video segment of 5 seconds and a video segment of 3 seconds can be inserted into the media insertion slot, the video segment of 3 seconds being a video segment extracted from the video segment of 5 seconds. Alternatively, the video segment of 5 seconds can be extended to a video segment with a length of 8 seconds and inserted into the media insertion slot.

With the present disclosure, the length of the media segment can match the length of the media insertion slot, thus the technical solution of the disclosure is improved.

In some embodiments, before inserting the media segment into the media template or otherwise at any moment, the method of editing media can further comprise receiving a segment editing instruction, and editing the media segment.

In some instances, the process of editing the media segment can comprise filtering out a video segment having a length less than a preset length (e.g., hiding the video segment having a length less than a preset in the media library or removing such video segment). Optionally, the process of editing the media segment can comprise modifying the media segment, such as modifying a length, a resolution or a recording time point, or trimming the media segment.

In some embodiments, after the media segment is inserted into the media template, the process of editing the media segment can comprise one or more of adjusting an order of the media segments, removing a specified media segment, or inserting a new media segment.

For instance, after the media segment is inserted into the media template, the order of the media segment can be adjusted by drag and drop. Optionally, one or more media segments, which have been inserted into the media template, can be removed. Optionally, one or more new media segments can be selected and inserted into the media template.

With embodiments of the disclosure, the media segment can be edited, thus the technical solution of the disclosure is improved.

In some embodiments, the method of editing media can further comprise, when receiving a template editing instruction, editing the media parameter based upon the template editing instruction.

In some instances, editing the media template can comprise modifying the media parameter of the media template. For example, the media parameter can comprise at least one of the number of media insertion slots, a preset length of the media insertion slot, a filter, a color, a tone, a sound an effect, a prologue, an epilogue, a background music or a voice-over of the media template.

With embodiments of the disclosure, the media template can be edited, thus various styles of the media template can be available.

In some embodiments, after a video work is generated from the media template into which the media segment is inserted, a media template identified by the template changing instruction can be loaded from the template library when the template changing instruction is received, so as to implement a media template changing.

In some instances, the media template can be changed when the template changing instruction is received when the generated video work is previewed or played back.

With embodiments of the disclosure, the media template can be changed after the video work is generated, thus the technical solution of the disclosure is improved. The media template can be changed at various stages of the method, such that the operation can be flexible.

An example of the method of editing media will be provided for better understanding of the disclosure.

Upon opening the media editor, the default media template can be automatically loaded from the template library. Optionally, the media template selecting instruction can be received, and the media template specified by the media template selecting instruction can be loaded from the template library. For example, the media template is "Q0", and as specified by the media parameters of "Q0", a background music is "track 9" and the number of media insertion slots is "5", where the 5 media insertion slots being indicated as "a", "b", "c", "d" and "e", respectively. In the example, a length of media insertion slot "a" is 5 seconds, a length of media insertion slot "b" is 8 seconds, a length of media insertion slot "c" is 9 seconds, and a length of media insertion slot "d" is 8 seconds.

Media segments can be stored in the media library of the media editor. In some instances, the media segments can be built-in segments in the media editor. Optionally, the media segments can be segments which are stored into the media library by the user. The media segment can comprise a video segment, a photo or a text. The media segment selecting instruction can be received by the media editor, and one or more media segments can be received from the media library based upon the media segment selecting instruction. In the example, four media segments are extracted, which media segments being indicated as "1", "2", "3" and "4" respectively, where the media segment "1" is a video of 3 seconds, the media segment "2" is a video of 12 seconds, the media segment "3" is a video of 10 seconds, and the media segment "4" is a video of 8 seconds. The media segment editing instruction can be received, and an order by which the media segments are inserted into the media template can be adjusted. In the example, the adjusted order is "2" "4" "1" "3", meaning that the media segment "2" is inserted into the media insertion slot "a", the media segment "4" is inserted into the media insertion slot "b", the media segment "1" is inserted into the media insertion slot "c", and the media segment "3" is inserted into the media insertion slot "d". In the process of inserting media segments into the media template, when a second template changing instruction is received, a media template "Q2" specified by the second template changing instruction can be loaded from the template library, and the media template "Q0" can be changed to the media template "Q2". In inserting the media segment "2" with a length of 12 seconds into the media insertion slot "a" with a length of 5 seconds, a video segment of 5 seconds can be generated to match the media insertion slot "a" by extracting a segment matching the length of the media insertion slot by automatically expending from the midpoint of the timeline to both sides of the media segment "2". Optionally, a segment trimming instruction can be received, and a video segment of 5 seconds can be generated by trimming the media segment "2" based upon the segment trimming instruction. In inserting the media segment "4" into the media insertion slot "b", no particular processing is necessary. In inserting the media segment "1" into the media insertion slot "c", the media segment "1" with a length of 3 seconds can be extended to a media segment with a length of 9 seconds to match the media insertion slot "c" with a length of 9 seconds. Optionally, the media segment "1" can be inserted into the media insertion slot "c" three times. During inserting the media segment "3" into the media insertion slot "d", the media segment "3" can be trimmed.

When the media editor receives a template changing instruction, the media template "Q1" specified by the template changing instruction can be loaded from the template library, and the current media template "Q0" can be changed to the media template "Q1" based upon the template changing instruction. For example, the background music of the media template "Q1" can be "track 8", and the number of the media insertion slots can be five. In changing the media template, the order of the media segments can be maintained unchanged, and the media editor can simply edit the media segments which are inserted into the media insertion slots based upon the media parameters of the media template "Q1". In this example, as the number of current media segments (e.g., four) is less than the number of media insertion slots of the media template "Q1" (e.g., five), the media editor can be configured to receive a media segment selecting instruction to select a media segment "5" (e.g., a video segment of 10 seconds) from the media library based upon the media segment selecting instruction, and insert the media segment "5" into the fifth media insertion slot of the media template "Q1".

When the user attempts to adjust the media segments after the media segments are inserted into the media template, the media editor can be configured to receive an instruction and perform corresponding operations such as adjusting the order of the media segments, removing a specified media segment or inserting a new media segment.

After the media segments are inserted into the media template or the media template is changed, a video work can be automatically generated from the current media template into which the media segments are inserted. Optionally, the user can press a button on the media editor, and the media editor can be configured to receive a video work generating instruction and generate a video work from the current media template into which the media segments are inserted.

When a template changing instruction is received When the media editor plays the video work generated from the media template "Q1" with its display, and another template changing instruction is received, the media editor can be configured to load a media template "Q3" specified by the template changing instruction from the template library and change the current media template "Q1" by the media template "Q3". The order of the media segments in the video work can be maintained unchanged.

The media editor can be configured to receive a media template from the user or from other devices such as a network server, and store the media template into the media library. The media editor can be configured to receive the template editing instruction from a user and modify a media parameter of the media template. For example, the background music of the media template can be modified based upon the template editing instruction.

Figure 2:
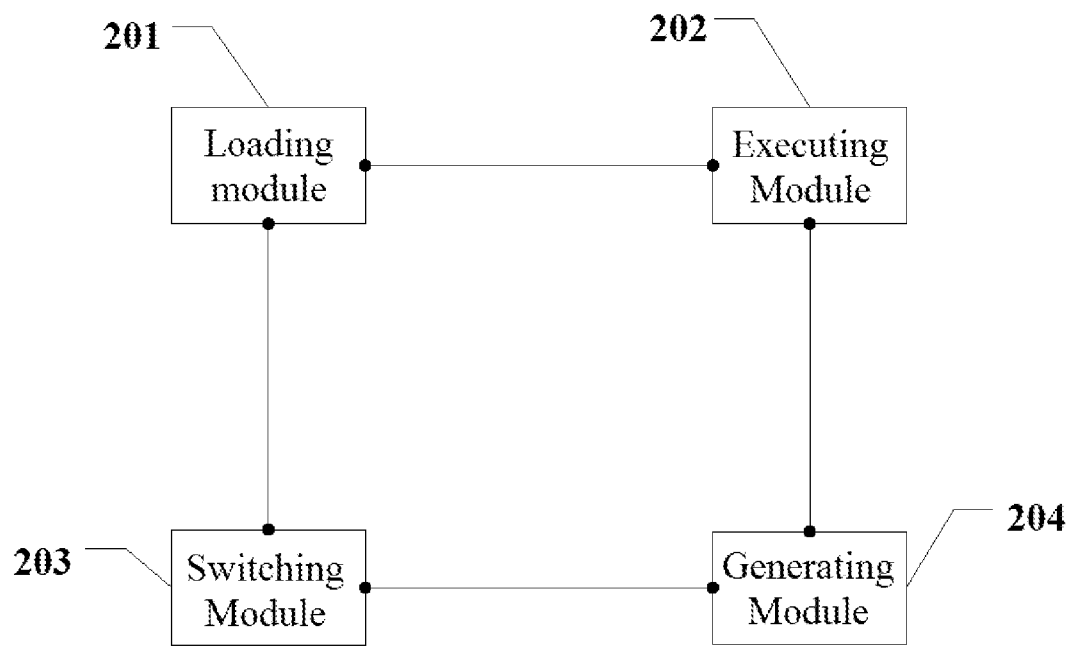
FIG. 2 shows a media editor in accordance with embodiments of the disclosure.

FIG. 2 shows a media editor in accordance with embodiments of the disclosure. The media editor can comprise an loading module 201 configured to load a default media template or a specified media template from a template library; an executing module 202 configured to receive a media segment selecting instruction, select a media segment from a media library based upon the media segment selecting instruction and insert the media segment into the media template; a switching module 203 configured to load a media template specified by a template changing instruction from the template library and change the media template when the template changing instruction is received; and a generating module 204 configured to generate a video work from the media template into which the media segment is inserted.

In some embodiments, the switching module 203 can be further configured to, when the template changing instruction is received in selecting a media segment from the media library based upon the media segment selecting instruction, load a media template specified by the template changing instruction from the template library and change the media template.

In some embodiments, the executing module 202 can be further configured to obtain a parameter of the media template. The media parameter can include the number of the media insertion slots. In some instances, the number of the media insertion slots can be greater than or equal to 1.

In some embodiments, the executing module 202 can be further configured to, when the number of media segments is less than the number of media insertion slots of the media template, receive a second media segment selecting instruction, select one or more media segments from the media library based upon the second media segment selecting instruction, and insert the one or more media segments into the media template.

On some embodiments, the media template can comprise at least one media insertion slot. The executing module 202 can be further configured to, when a length of the media segment is longer than the length of the media insertion slot, trim the length of the media segment to generate a media segment matching the length of the media insertion slot.

In some embodiments, the executing module 202 can be further configured to cut out an identical part in timeline from both the beginning and the end of the media segment, or, receive a segment trimming instruction and trim a media segment of a specified timeline from the media segment based upon the segment trimming instruction.

In some embodiments, the executing module 202 can be further configured to, when the length of the media segment is shorter than the length of the media insertion slot, extend the length of the media segment to the length of the media insertion slot, or insert the media segment into the media insertion slot repeatedly.

Figure 3:
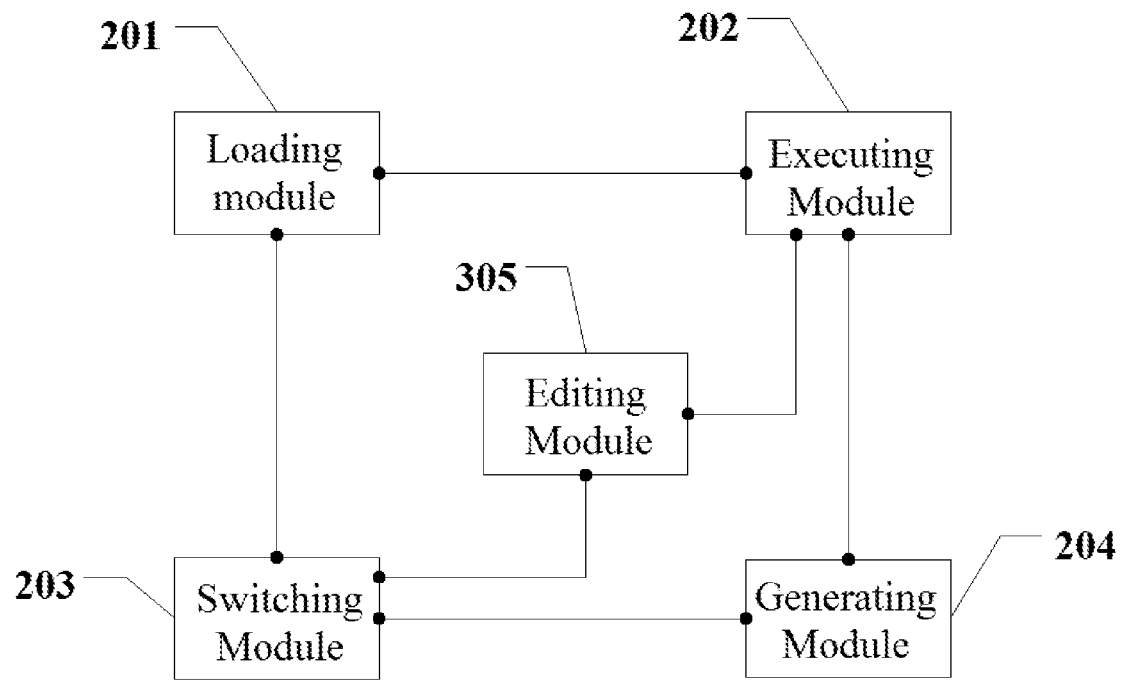
FIG. 3 shows a media editor in accordance with alternative embodiments of the disclosure.

In some embodiments, as shown in FIG. 3, the media template can comprise a media parameter. The media editor can further comprise an editing module 305 configured to receive a segment editing instruction and edit the media segment.

In some embodiments, the editing module 305 can be further configured to, after the media segment is inserted into the media template, performing one or more of adjusting an order of the media segment, removing a specified media segment and inserting a new media segment.

In some embodiments, the executing module 202 can be further configured to obtain one or more media parameters including a filter, a color, a tone, a sound effect, a prologue, an epilogue, a background music or a voice-over.

In some embodiments, the editing module 305 can be further configured to, upon receiving a template editing instruction, edit the media parameter based upon the template editing instruction.

In some embodiments, the switching module 203 can be further configured to load a media template specified by another template changing instruction from the template library and change the media template changing when the another template changing instruction is received after a video work is generated.

In some embodiments, the executing module 202 can be further configured to receive a media segment from the media library based upon the media segment selecting instruction. The media segment can include a video segment, a photo or a text, In the embodiment as discussed hereinabove, the loading module 201 can load the default media template or the specified media template from the template library. The executing module 202 can receive the media segment selecting instruction, select one or more media segments from the media library based upon the media segment selecting instruction, and insert the selected one or more media segments into the media template. The switching module 203 can receive the template changing instruction, load a media template specified by the template changing instruction from the template library, and change the media template. The generating module 204 can generate a video work from the media template into which the one or more media segments are inserted. The user's operation in composing a video work can be simplified and accelerated by simply selecting a media segment and inserting the media segment into the media template. When the user is not satisfied with the current media template, other media templates can be selected to implement a template changing, such that various video styles can be effected.

In some embodiments of the disclosure, the apparatus implementing a media editing function can be referred to as a media editor. The media editor can be a server, a terminal device or a logic unit of a device. With the media editor, the media template can be changed in inserting the media segments into the media template. The disclosure will be described by reference to illustrative embodiments.

An interaction between modules of the media editor will be described with reference to an embodiment of the disclosure.

As shown in FIG. 3, when a user opens the media editor, a loading module 201 can be configured to automatically load the default media template from the template library. Optionally, the loading module 201 can be configured to receive a media template selecting instruction and load a media template specified by the media template selecting instruction from the template library. For example, the selected media template is "Q0", and as specified by the media parameters of "Q0", a background music is "track 9", and the number of media insertion slots is "5", where the five media insertion slots being indicated as "a", "b", "c", "d" and "e", respectively. In the example, a length of media insertion slot "a" is 5 seconds, a length of media insertion slot "b" is 8 seconds, a length of media insertion slot "c" is 9 seconds, and a length of media insertion slot "d" is 8 seconds.

Media segments can be stored in the media library of the media editor. In some instances, the media segments can be built-in segments in the media editor. Optionally, the media segments can be segments which are stored into the media library by the user. The media segment can comprise a video segment, a photo or a text. The executing module 202 can be configured to receive the media segment selecting instruction and select one or more media segments from the media library based upon the media segment selecting instruction. In the example, four media segments are extracted, which media segments being indicated as "1", "2", "3" and "4" respectively, where the media segment "1" is a video of 3 seconds, the media segment "2" is a video of 12 seconds, the media segment "3" is a video of 10 seconds, and the media segment "4" is a video of 8 seconds. The editing module 305 can be configured to receive the media segment editing instruction and adjust the order by which the media segments are inserted into the media template. In the example, the adjusted order is "2" "4" "1" "3", meaning that the executing module 202 can be configured to insert the media segment "2" into the media insertion slot "a", insert the media segment "4" into the media insertion slot "b", insert the media segment "1" into the media insertion slot "c" and insert the media segment "3" into the media insertion slot "d". In the process of inserting media segments into the media template, when the switching module 203 receives a template changing instruction, then a media template "Q2" specified by the template changing instruction can be loaded from the template library, and the media template "Q0" can be changed to the media template "Q2". In the executing module 202 inserting the media segment "2" into the media insertion slot "a", the executing module 202 can be configured to generate a video segment of 5 seconds to match the media insertion slot "a" by extracting a segment matching the length of the media insertion slot by automatically expending from the midpoint of the timeline to both sides of the media segment "2". Optionally, the executing module 202 can be configured to receive a segment trimming instruction, and generate a video segment of 5 seconds by trimming the media segment "2" based upon the segment trimming instruction. In the executing module 202 inserting the media segment "4" into the media insertion slot "b", no particular processing is necessary. In the executing module 202 inserting the media segment "1" into the media insertion slot "c", the executing module 202 can be configured to extend the media segment "1" with a length of 3 seconds to a media segment with a length of 9 seconds to match the media insertion slot "c" with a length of 9 seconds. Optionally, the executing module 202 can be configured to insert the media segment "1" into the media insertion slot "c" three times. In the executing module 202 inserting the media segment "3" into the media insertion slot "d", the media segment "3" can be trimmed.

When the switching module 203 receives a template changing instruction, the media template "Q1" specified by the template changing instruction can be loaded from the template library, and the current media template "Q0" can be changed to the media template "Q1" based upon the template changing instruction. For example, the background music of the media template "Q1" can be "track 8", and the number of the media insertion slots can be five. In changing the media template, the order of the media segments can be maintained unchanged, and the media editor can simply edit the media segments which are inserted into the media insertion slots based upon the media parameters of the media template "Q1". In this example, as the number of current media segments (e.g., four) is less than the number of media insertion slots of the media template "Q1" (e.g., five), the media editor can be configured to receive a media segment selecting instruction to select a media segment "5" (e.g., a video segment of 10 seconds) from the media library based upon the media segment selecting instruction, and insert the media segment "5" into the fifth media insertion slot of the media template "Q1".

When the user wants to adjust the media segments after the media segments are inserted into the media template, the editing module 305 can be configured to receive an instruction and perform corresponding operations such as adjusting the order of the media segments, removing a specified media segment or inserting a new media segment.

After the media segments are inserted into the media template or the media template is changed, the generating module 204 can be configured to automatically generate a video work from the current media template into which the media segments are inserted. Optionally, the user can press a button on the media editor, and the generating module 204 can be configured to receive a video work generating instruction and generate a video work from the current media template into which the media segments are inserted.

When the switching module 203 receives a template changing instruction when the media editor plays on its display the video work generated from the media template "Q1", then the switching module 203 can be configured to load a media template "Q3" specified by the template changing instruction from the template library and change the current media template "Q1" by the media template "Q3". The order of the media segments in the video work can be maintained unchanged.

The media editor can be configured to receive a media template from the user or from other devices such as a network server, and store the media template into the media library. The editing module 305 can be configured to receive the template editing instruction from a user and modify a media parameter of the media template. For example, the background music of the media template can be modified based upon the template editing instruction.

Embodiments of the disclosure further provides a media computer. The media computer can implement functions of the media editor. A program can be stored in a storage medium of the media computer, and when executed, the program can implement some or all steps of the method of editing media as discussed in the embodiments hereinabove.

Figure 4:
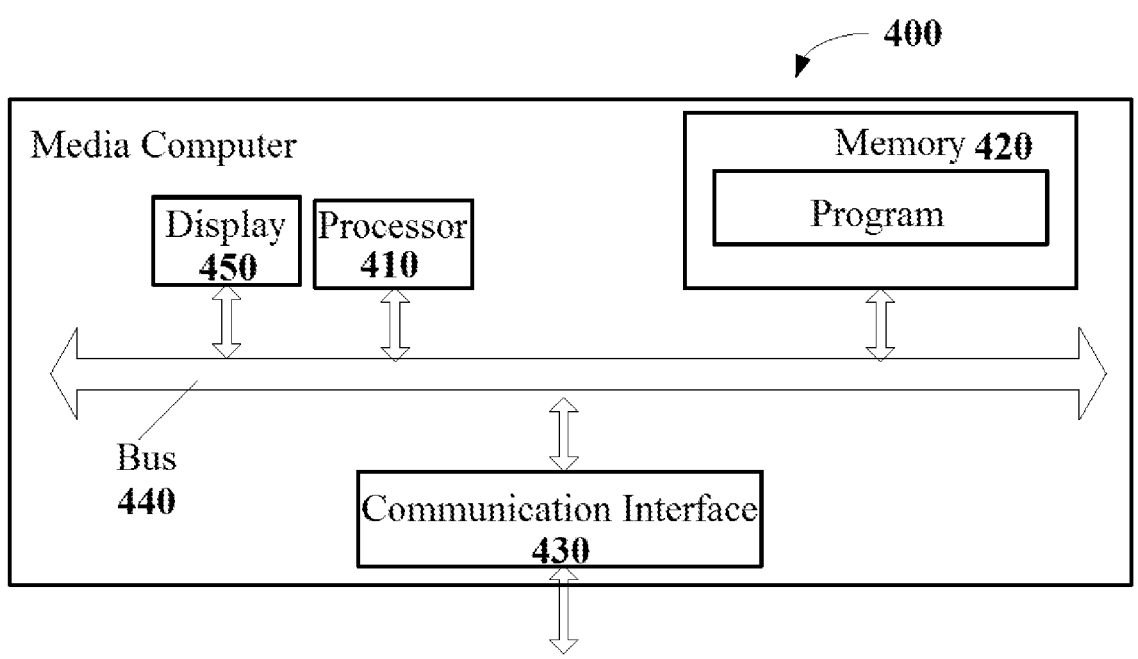
FIG. 4 shows a media computer in accordance with embodiments of the disclosure.

FIG. 4 shows a media computer 400 in accordance with embodiments of the disclosure. In some embodiments, the media computer 400 can comprise a processor 410, a display 450, a memory 420, a communication interface 430 and a bus 440. The processor 410, the memory 420 and the communication interface 430 can communicate with each other via the bus 440. The communication interface 430 can be configured to receive and transmit an instruction. The memory 420 can be configured to store a program. The processor 410 can be configured to execute the program stored in the memory 420. The display 450 can be configured to display a video work generated by the processor 410.

In some instances, the bus 440 can be an Industry Standard Architecture (ISA) bus, a Peripheral Component Interconnection (PCI) bus or an Extended Industry Standard Architecture (EISA) bus. The bus can comprise one or more of an address bus, a data bus or a control bus. Only one bus is shown in FIG. 4 for simplicity purposes, however, the disclosure is not thus limited, and various number of bus or various types of bus can be used.

The memory 420 can be configured to store an executable program code. The executable program code can comprise a computer operating instruction. When the media computer 400 executes the executable program code, steps 101-104 of the method of editing media as described in embodiment with reference to FIG. 1 can be implemented, and functions of the media editor as described in embodiment with reference to FIG. 2. The memory 420 can include a high-speed Random Access Memory (RAM). Optionally, the memory 420 can include a non-volatile memory. For example, the memory 420 can include a magnetic disk memory.

In some instances, the processor 410 can be a Central Processing Unit (CPU). Optionally, the processor 410 can be an Application Specific Integrated Circuit (ASIC). Still optionally, the processor 410 can be one or more integrated circuits configured to implement embodiments of the disclosure.

In some embodiments, the processor 410 can be configured to perform processes including loading a default media template or a specified media template from a template library; receiving a media segment selecting instruction, selecting one or more media segments from a media library based upon the media segment selecting instruction, and inserting the one or more media segments into the media template; when a template changing instruction is received, loading a media template specified by the template changing instruction from the template library and changing the media template changing; and generating a video work from the media template into which the one or more media segments are inserted.

In some embodiments, the processor 410 can be further configured to perform processes including, when a template changing instruction is received in selecting the one or more media segments from the media library based upon the media segment selecting instruction, loading a media template specified by the template changing instruction from the template library and changing the media template.

In some embodiments, the processor 410 can be further configured to perform processes including obtaining a media parameter of the media template. In some instances, the media parameter can include the number of media insertion slots. The number of media insertion slots can be greater than or equal to 1.

In some embodiments, the processor 410 can be further configured to perform processes including, after the media template being changed, when the number of media segments is less than the number of media insertion slots of the media template, receiving another media segment selecting instruction, selecting one or more media segments from the media library based upon the another media segment selecting instruction, and inserting the one or more media segments into the media template.

In some embodiments, the processor 410 can be further configured to perform processes including, when a length of the media segment is longer than the length of the media insertion slot, trimming the media segment to generate a segment matching the length of the media insertion slot.

In some embodiments, the processor 410 can be further configured to perform processes including extracting a segment matching the length of the media insertion slot by automatically expending from the midpoint of the timeline to both sides of the media segment, or, receiving a segment trimming instruction and extracting a media segment of a specified time period from the media segment based upon the segment trimming instruction.

In some embodiments, the processor 410 can be further configured to perform processes including, when the length of the media segment is shorter than the length of the media insertion slot, extending the length of the media segment to the length of the media insertion slot, or inserting the media segment into the media insertion slot repeatedly.

In some embodiments, the processor 410 can be further configured to perform processes including receiving a segment editing instruction, and editing the one or more media segments.

In some embodiments, the processor 410 can be further configured to perform processes including one or more of, after the media segment is inserted into the media template, adjusting an order of the media segments, removing a specified media segment, or inserting a new media segment.

In some embodiments, the processor 410 can be further configured to perform processes including obtaining one or more media parameters including a filter, a color, a tone, a sound effect, a prologue, an epilogue, a background music or a voice-over.

In some embodiments, the processor 410 can be further configured to perform processes including, upon receiving a template editing instruction, editing the media parameter based upon the template editing instruction.

In some embodiments, the processor 410 can be further configured to perform processes including, when another template changing instruction is received, loading a media template specified by the another template changing instruction from the template library and changing the media template.

In some embodiments, the processor 410 can be further configured to perform processes including selecting a video segment, a photo or a text from the media library based upon the media segment selecting instruction.

It will be appreciated that, the function implemented by each functional module of the computer device can be substantially identical to the steps of the methods as described in embodiments of the disclosure; therefore, a detailed description of the function implemented by each functional module is omitted for purpose of simplicity.

With the present disclosure, the user's operation in composing a video work can be simplified and accelerated by simply selecting a media segment and inserting the media segment into the media template. When the user is not satisfied with the current media template, other media templates can be selected to implement a template changing, such that various video styles can be effected.

It will be appreciated by those skilled in the art that, the principles in implementing the systems, devices and units as described herein above can be substantially identical to those in implementing the methods provided in embodiments of the disclosure. A detailed description to the embodiments of the systems, devices and units will be omitted for conciseness It will be appreciated that, the system, device and method as provided in embodiments of the disclosure can be implemented with various approaches. The embodiments providing the device are merely illustrative. For example, various units of the device can be provided as logical units in sense of logic functions, and can be provided as different logical units in practical implementation. For example, units or components can be combined or otherwise integrated into another system. For example, some features can be ignored or not implemented. A coupling, a direct coupling, or a communication connection, as shown and used in this disclosure, can be an indirect coupling or an indirect communication connection via an interface, a device or a unit. The coupling can be an electrical coupling, a mechanical coupling or a coupling provided in other forms.

Units illustrated as separate parts may be or may not be physically separated. Components shown as physical units may be or may not be physical units. For example, components may be provided in one single position, or may be distributed over a plurality of network units. Some or all components may be used to implement the disclosure in view of actual requirements.

Functional unit of embodiments of the disclosure may be integrated into one processing unit. Alternatively functional units may be provided as separate units. Still alternatively, two or more functional units may be integrated into one unit. The functional units may be integrated as a hardware or a software.

When the integrated unit is implemented as a software and sold or used as a software product, it may be stored in a computer-readable storage medium. In this regard, the technical solutions of the disclosure, in essence or any inventive part over the prior art, may be embodied in form of software product. The software product can be stored in a storage medium. The software product can include instructions directing a computer device (e.g., a personal computer, a server, or a network device) to execute some or all steps of the method provided in embodiments of the disclosure. The storage medium can include a USB disk, a portable hard disk, a Read-Only Memory (ROM), a Random Access Memory (RAM), a magnetic disk or an optical disk which is capable of storing program codes.

The foregoing embodiments are intended to merely illustrate rather than limit the disclosure. While the present disclosure has been described in detail with reference to the foregoing embodiments, it will be obvious to those skilled in the art that various changes, modifications or substitutions can be made to the embodiments or features thereof, without departing from the spirit and scope of the disclosure.

What is claimed is:

1. A method of editing media, comprising:
    loading a media template from a template library, the media template including one or more media insertion slots;
    receiving a media segment selecting instruction;
    selecting one or more media segments from a media library based upon the media segment selecting instruction;
    inserting the one or more media segments into the media template by inserting each of the one or more media segments into a corresponding one of the one or more media insertion slots, wherein inserting a media segment into a corresponding media insertion slot includes:
        if a length of the media segment is longer than a length of the corresponding media insertion slot, automatically extracting a middle portion of the media segment matching the length of the corresponding media insertion slot as a trimmed media segment for inserting into the corresponding media insertion slot, the middle portion of the media segment comprising a midpoint of the media segment; and
        if a length of the media segment is shorter than a length of the corresponding media insertion slot, inserting the media segment as a whole into the corresponding media insertion slot repeatedly;
    generating a video based on the media template containing the one or more media segments; and
    in response to receiving a segment editing instructions, editing media segments in the media library by hiding one of the media segments that has a length shorter than a preset length from being displayed or deleting the one of the media segments from the media library.

2. The method of editing media of claim 1,
    wherein the media template is a first media template, the method further comprising:
        receiving a template changing instruction during selecting the one or more media segments from the media library;
        loading a second media template specified by the template changing instruction from the template library; and
        changing from the first media template to the second media template for inserting the one or more media segments,
    wherein generating the video includes generating the video based on the second media template containing the one or more media segment.

3. The method of editing media of claim 2, wherein loading the second media template specified by the template changing instruction from the template library includes:
    obtaining a media parameter of the second media template, the media parameter including a number of media insertion slots, and the number of media insertion slots being greater than or equal to 1.

4. The method of editing media of claim 3, further comprising, after changing from the first media template to the second media template:
    if a number of media segments is smaller than the number of media insertion slots of the second media template, receiving another media segment selecting instruction, selecting one or more additional media segments from the media library based upon the another media segment selecting instruction, and inserting the one or more additional media segments into the media template.

5. The method of editing media of claim 1, further comprising:
    after inserting the one or more media segments into the media template, performing one or more of adjusting an order of the media segments, removing a specified one of the media segments, or inserting a new media segment.

6. The method of claim 5, wherein adjusting the order of the media segments includes automatically adjusting the order of the media segments before generating the video.

7. The method of editing media of claim 1,
    wherein loading the media template includes obtaining a media parameter of the media template, the media parameter includes one or more of a number of media insertion slots, a filter, a color, a tone, a sound effect, a prologue, an epilogue, a background music, and a voice-over,
    the method of editing media further comprising:
        in response to receiving a template editing instruction, editing the media parameter based upon the template editing instruction.

8. The method of editing media of claim 7, wherein editing the media parameter includes modifying the number of media insertion slots of the media template.

9. The method of editing media of claim 1,
    wherein the media template is a first media template,
    the method further comprising:
        receiving a template changing instruction after generating the video based on the first media template containing the one or more media segments;
        loading a second media template specified by the template changing instruction from the template library; and
        changing from the first media template to the second media template.

10. The method of editing media of claim 9, wherein receiving the template changing instruction includes receiving the template changing instruction after generating the video based on the first media template and while the video is being played back.

11. A media computer, comprising:
    a display; and
    a processor configured to:
        load a media template from a template library, the media template including one or more media insertion slots;
        receive a media segment selecting instruction;
        select one or more media segments from a media library based upon the media segment selecting instruction;
        insert the one or more media segments into the media template by inserting each of the one or more media segments into a corresponding one of the one or more media insertion slots, wherein inserting a media segment into a corresponding media insertion slot includes:
            if a length of the media segment is longer than a length of the corresponding media insertion slot, automatically extracting a middle portion of the media segment matching the length of the corresponding media insertion slot as a trimmed media segment for inserting into the corresponding media insertion slot, the middle portion of the media segment comprising a midpoint of the media segment; and if a length of the media segment is shorter than a length of the corresponding media insertion slot, inserting the media segment as a whole into the corresponding media insertion slot repeatedly;

generate a video based on the media template containing the one or more media segments; and in response to receiving a segment editing instructions, edit media segments in the media library by hiding one of the media segments that has a length shorter than a preset length from being displayed or deleting the one of the media segments from the media library.

12. The media computer of claim 11, wherein:
the media template is a first media template, and
the processor is further configured to:
    receive a template changing instruction during selecting the one or more media segments from the media library;
    load a second media template specified by the template changing instruction from the template library; and
    change from the first media template to the second media template for inserting the one or more media segments, and
    generate the video based on the second media template containing the one or more media segment.

13. The media computer of claim 12, wherein the processor is further configured to:
    obtain a media parameter of the second media template, the media parameter including a number of media insertion slots, and the number of media insertion slots being greater than or equal to 1.

14. The media computer of claim 13, wherein the processor is further configured to, after changing from the first media template to the second media template:
    if a number of media segments is smaller than the number of media insertion slots of the second media template, receive another media segment selecting instruction, select one or more additional media segments from the media library based upon the another media segment selecting instruction, and insert the one or more additional media segments into the media template.

15. The media computer of claim 11, wherein the processor is further configured to:
    after inserting the one or more media segments into the media template, perform one or more of adjusting an order of the media segments, removing a specified one of the media segments, or inserting a new media segment.

16. The media computer of claim 15, wherein the processor is further configured to automatically adjust the order of the media segments before generating the video.

17. The media computer of claim 11, wherein the processor is further configured to:
    obtain a media parameter of the media template, the media parameter includes one or more of a number of media insertion slots, a filter, a color, a tone, a sound effect, a prologue, an epilogue, a background music, and a voice-over, and
    in response to receiving a template editing instruction, edit the media parameter based upon the template editing instruction.

18. The media computer of claim 11, wherein:
the media template is a first media template, and
the processor is further configured to:
    receive a template changing instruction after generating the video based on the first media template containing the one or more media segments;
    load a second media template specified by the template changing instruction from the template library; and
    change from the first media template to the second media template.

* * * * *